…

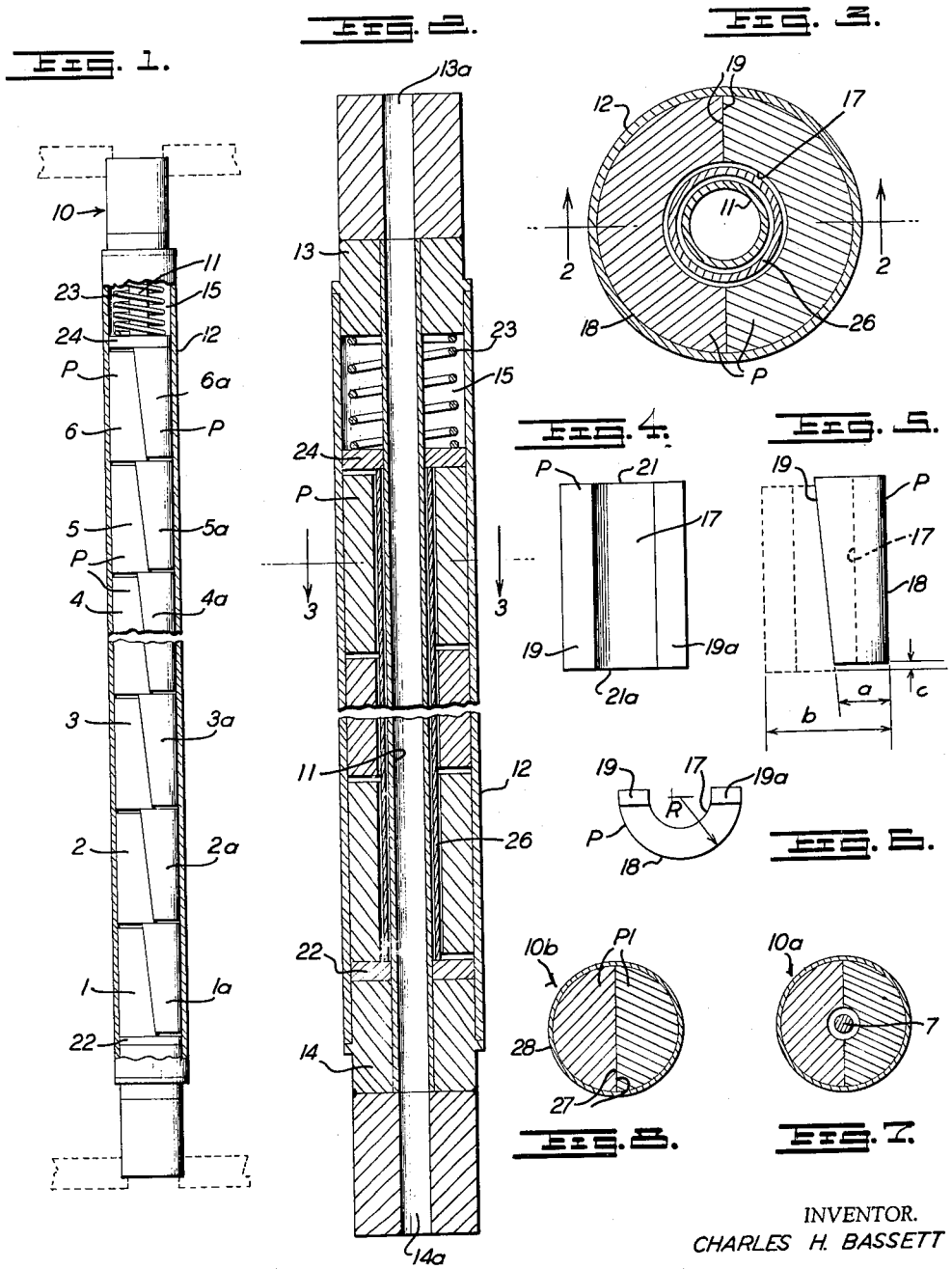

United States Patent Office 2,983,663
Patented May 9, 1961

2,983,663
FUEL ELEMENT FOR NUCLEAR REACTORS

Charles H. Bassett, Riverdale, Md., assignor, by mesne assignments, to the United States of America, as represented by the United States Atomic Energy Commission Filed Feb. 10, 1959, Ser. No. 792,341
13 Claims. (Cl. 204—193.2)

This invention relates to fuel elements for nuclear reactors and, more particularly, to a fuel element particularly adapted for use in reactors of high power density used to generate steam for the production of electricity.

The present trend of thermal-reactor research is toward ceramic compounds, since an apparent limit on reactor operating temperatures and fuel burnup is imposed by swelling of metallic fuels at operating temperatures above 400° C. This swelling of metallic fuel is due in part to fission-product gases. When four atoms of U–235 are fissioned, one of the eight fission-product atoms formed is either xenon or krypton which are practically insoluble in uranium and are under very high pressure within the solid fuel lattice structure. As the maximum achievable burnup of metallic fuel is inversely related to the temperature of the fuel during irradiation, the theory is that metallic uranium becomes weaker at high temperatures, thereby permitting the expansion of internal fission-product gases to increase the size of the fuel elements by swelling to unacceptable limits.

One of the methods for overcoming the swelling problem is to use high density ceramic materials, such as uranium oxide ($UO_2$) enriched with U–235, in the form of sintered cylindrical pellets which have a high melting point (2760° C.), good mechanical strength, good resistance to radiation damage, and high burnups. Burnups greater than 25,000 Mwd./ton appear feasible without appreciable damage to the $UO_2$ and the structural confining material. The release of fission-product gases xenon and krypton from the irradiated $UO_2$ is diffusion controlled and hence high density $UO_2$ without interconnecting pores releases only very small amounts of the gases.

To prevent the escape of fission-product gases, sintered cylindrical ceramic fuel pellets have heretofore been housed within a metallic tube of compatible material, such as austenitic stainless steel or zirconium. Due to the relatively low neutron absorption of zirconium, it is preferred as a tubing material to effect savings through the use of uranium of lower enrichment, and through the reduction in the critical mass of uranium.

The thermal coefficient of expansion of stainless steel is greater than that of $UO_2$, whereas zirconium expansion is less than $UO_2$. This factor is of importance in fuel element design. Where a gap exists between the fuel and the tubing, the fuel pellet must operate at high temperatures in order to transfer heat across the gap. Heretofore, it has been the practice to grind cylindrical fuel pellets to close tolerances for snug engagement within close tolerance tubing, and such precision fabrication is very costly. To avoid finishing cylindrical pellets and tubing to exact size, fuel pellets have been thermally bonded to the tubing by a lead filler, as disclosed in Patent 2,838,452, issued June 10, 1958 to John M. West. Such a lead filler results in an increase in the loss of neutrons by parasitic capture, has a low coefficient of heat conductivity and is fluid at relatively low operating temperatures.

An object of the invention is to provide a fuel element for releasing energy by a nuclear chain reaction while regenerating fertile fuel material therein, such as uranium-238 or thorium-232.

Another object of the invention resides in the provision of a fuel element structure wherein fissionable ceramic fuel pellets in the form of segments of a cylinder, or segments of a cylindrical tube, are biased axially and radially by a compression spring into tight contact engagement against the inner surface of an outer tube to eliminate any gap therebetween, the segments preferably defining a central opening and radial passages leading therefrom to the tube for the transfer of heat to the latter and also to provide space to receive fission-product gases. Higher burnup of the fissionable material is thus achieved by providing additional space to receive the fission-product gases.

Another object of the present invention resides in the provision of a nuclear reactor fuel element comprising a stack of enriched ceramic fuel pellet segments biased radially against the inner surface of an outer tube by means of tapered wedge surfaces formed thereon and a compression spring.

Another object of the invention resides in the provision of a fuel element wherein the fuel pellet segments are formed of high density sintered uranium oxide ($UO_2$) enriched with uranium-235, the segments being identical to reduce the cost of manufacture.

Another object of the invention resides in the provision of a fuel element comprising concentric inner and outer tubes defining an annular chamber to receive the stack of fuel pellet segments, the inner tube providing a passageway for the flow of fluids to be heated or superheated.

Another object of the invention resides in the provision of a fuel element embodying a rod or tube of burnable poison material, such as boron, said poison being disposed centrally between the fuel segments.

Another object of the invention resides in the provision of a fuel element comprising concentric inner and outer tubes, and a metallic tube containing the burnable poison enclosing the inner tube.

The invention embodies other novel features, details of construction and arrangement of parts which are hereinafter set forth in the specification and claims and illustrated in the accompanying drawings forming part thereof, wherein:

Fig. 1 is a side elevation, partly in section, illustrating a nuclear reactor fuel element embodying features of the invention.

Fig. 2 is an enlarged longitudinal section taken along the line 2—2 of Fig. 3.

Fig. 3 is an enlarged transverse section taken along the line 3—3 of Fig. 2.

Fig. 4 is a detail front elevation showing the fuel pellet in the form of a segment of a cylindrical tube.

Fig. 5 is a side elevation illustrating the fuel segment as formed with coplanar tapered surfaces for wedge engagement against complementary tapered surfaces on a companion segment.

Fig. 6 is an end elevation showing the fuel segment.

Fig. 7 is a transverse section, corresponding to Fig. 3, illustrating a modified form of the invention.

Fig. 8 is a transverse section, corresponding to Fig. 3, illustrating another embodiment of the invention.

Referring now to the drawings for a better understanding of the invention, and more particularly to Figs. 1 through 6 therein, the fuel element 10 is shown as comprising inner and outer concentric tubes 11 and 12, respectively, of stainless steel, or zirconium, having plugs 13 and 14 of stainless steel, or other suitable material, secured to opposite ends thereof to form a leakproof housing having an annular chamber 15 to enclose a plurality of sets of identical fissionable fuel pellets P which are preferably formed of high density sintered uranium oxide ($UO_2$) enriched with uranium-235. The plugs 13 and 14 are formed with axial passages 13a and 14a which serve as inlet and outlet nozzles for the flow of fluid through the inner tube 11. As illustrated in the drawings, the fuel pellets P are in the form of segments of a cylindrical tube, each segment having concentric inner and outer arcuate surfaces 17 and 18, respectively, merging with flat coplanar tapered surfaces 19—19a and flat parallel end surfaces 21—21.

As illustrted in Figs. 1 and 5, the tapered surface 19 and 19a on each segment are disposed in a common plane at an angle "a" of, for example, 5 degrees from the longitudinal axis of the fuel element 10 for wedge engagement against complementary tapered surfaces 19—19a on a companion segment. The outer arcuate surface 18 of each segment has radius "R" corresponding to the radius of the inner surface of the outer tube 12. To insure wedge-tight engagement of the fuel segments against the inner surface of the outer tube 12, the tapered surfaces 19—19a are preferably accurately ground, whereby the ends of companion segments are offset longitudinally of the fuel element, as indicated at "C" in Fig. 5, for a distance of, for example, 0.015 to 0.030 inch when the segments define a cylinder having a diameter b equal to the inner diameter of the tube 12.

During assembly of a fuel element 10, as illustrated in Fig. 1, the fuel segments P are arranged in pairs, as indicated at 1—1a, 2—2a, 3—3a, etc., with the segment 1 abutting a heat insulation wafer 22 and being wedged radially by its companion segment 1a. It will be noted that the segments 2, 3, 4, etc., are in abutting engagement against the segments 1a, 2a, 3a, etc., respectively, and that the uppermost segment 6a is engaged by a stainless steel compression spring 23 and a heat insulating wafer 24 to urge the stack of segments axially against the heat insulating wafer 22, and to bias companion segments radially against the outer tube 12.

A fuel element of the type shown and described embodies certain important advantages over conventional rod type fuel elements, in that it provides a greater external surface area for the transfer of heat, the fuel segments are of a form adapted to be compressed to higher densities than cylindrical pellets, and the inner tube permits a transfer of heat from the center of the fuel element. The fuel element is also adapted to replace three or more conventional fuel rods in a reactor core, thereby materially reducing fabrication and reprocessing costs. The fuel element also embodies a burnable poison to control the reactivity of the reactor; whereas, in the use of conventional rod type fuel elements, it has heretofore been necessary to provide a burnable poison externally of the fuel elements. It is also contemplated that the burnable poison material may be alloyed with a metal, such as beryllium or aluminum, to form a tube 26 having a higher coefficient of heat conductivity than stainless steel.

By forming the fuel segments P of high density, fissionable ceramic materials, such as uranium oxide ($UO_2$) suitably enriched with uranium-235, they have good mechanical strength, good resistance to radiation damage, and a high melting point of approximately 2760° C. As fuel segments of this type may be formed without a high percentage of interconnecting pores, only small amounts of fission-product gases, xenon and krypton, are released during irradiation. The tubes 11 and 12 are preferably formed of zirconium due to its low neutron absorption properties and the resulting saving through the use of uranium of lower enrichment and the reduction in the critical mass of the uranium.

For control of excess reactivity, a tube of stainless steel 26 embodying a burnable poison, such as boron, is provided within the fuel element to enclose the inner tube 11.

During assembly of the fuel element the central opening and radial passages defined by the fuel segments may be filled with a suitable heat conducting gas, such as helium.

The fuel rod, thus shown and described, is adapted for use in a fuel element assembly for a nuclear power reactor, as shown and described in a copending application of James J. Dickson, filed August 26, 1958, Ser. No. 757,381, the disclosure of which is incorporated herein by reference. See also, Nucleonics, vol. 15, No. 7, July 1957, page 94, for Uranium Dioxide Properties and Characteristics.

Fig. 7 illustrates a modified form of the invention in which the fuel element 10a is similar to the form heretofore shown and described, except that the inner tube 11 and tube 26 have been omitted and replaced by a rod containing a burnable poison material.

In Fig. 8, the fuel element 10b is similar to the one shown in Fig. 7, except that the burnable poison rod is omitted, and the fuel P1 is in the form of pairs of segments of a cylinder having complementary tapered surfaces 27 to wedge themselves against the cladding tube 28 in response to axial movement of one of said segments in each pair of segments.

Standard assembling procedures are employed during assembly of the fuel element. Helium or other inert gas atmosphere is present in a dry box or remote assembling installation during assembling and sealing, and ordinary welding and brazing techniques are employed in sealing the plugs 13 and 14 to the ends of the tubes 11 and 12.

Having described a preferred embodiment of the present invention, it is to be understood that although specific terms and examples are employed, they are used in a generic and descriptive sense and not for purposes of limitation; the scope of the invention being set forth in the following claims.

What is claimed is:

1. In a nuclear reactor fuel element, a tubular housing, fissionable fuel in said housing, said fuel comprising pairs of segments of cylinders, each segment having tapered surfaces, said segment surfaces of each pair of segments being complementary to and in wedge engagement with each other to urge said segments radially against the inner side of said housing responsive to relative movement of said segments axially of the housing, and means to axially urge each pair of segments against each other.

2. In a nuclear reactor fuel element, a tubular housing, fissionable fuel in said housing, said fuel comprising pairs of segments of cylinders, each segment having tapered surfaces, said segment surfaces of each pair of segments being complementary to and in wedge engagement with each other to urge said segments radially against the inner side of said housing responsive to relative movement of said segments axially of the housing, and resilient means to axially urge each pair of segments against each other.

3. In a nuclear reactor fuel element, a tubular housing, fissionable fuel in said housing, said fuel comprising pairs of segments of cylinders, each segment having tapered surfaces, said segment surfaces of each pair of segments being complementary to and in wedge engagement with each other to urge said segments radially against the inner side of said housing responsive to relative movement of said segments axially of the housing, and means including a compression spring at one end of said housing to axially urge each pair of segments against each other.

4. In a nuclear reactor fuel element, a tubular housing, fissionable fuel in said housing, said fuel comprising pairs of segments of cylinders, each segment having tapered surfaces, said segment surfaces of each pair of segments being complementary to and in wedge engagement with each other to urge said segments radially against the inner side of said housing responsive to relative movement of said segments axially of the housing, means to axially urge each pair of segments against each other, said fuel segments comprising sintered high density uranium oxide.

5. In a nuclear reactor fuel element, a tubular housing, fissionable fuel in said housing, said fuel comprising pairs of segments or cylinders, each segment having tapered surfaces, said segment surfaces of each pair of segments being complementary to and in wedge engagement with each other to urge said segments radially against the inner side of said housing responsive to relative movement of said segments axially of the housing, means to axially urge each pair of segments against each other, said housing having a cylindrical inner surface, and each segment having an arcuate surface of the same radius as said cylindrical inner surface.

6. In a nuclear reactor fuel element, a tubular housing, fissionable fuel in said housing, said fuel comprising pairs of segments of cylinders, each segment having tapered surfaces, said segment surfaces of each pair of segments being complementary to and in wedge engagement with each other to urge said segments radially against the inner side of said housing responsive to relative movement of said segments axially of the housing, said segments defining a central opening, means within said housing to axially urge each pair of segments against each other and a burnable poison within said opening.

7. In a nuclear reactor fuel element, concentric spaced inner and outer tubes defining an annular space therebetween, nozzles secured to the ends of said tubes sealing said annular space and defining therewith a central fluid passage and an annular fuel chamber, fissionable fuel in said chamber, said fuel comprising pairs of segments of cylinders, said fuel provided with arcuate surfaces engaging the outer tube and complementary tapered surfaces in wedge engagement with each other to urge each pair of segments radially outwardly against the outer tube responsive to relative movement of one of said segments in each pair of segments axially of said outer tube, and means applying an axial compressive force on said pairs of segments to urge them radially outwardly.

8. In a nuclear reactor fuel element, concentric spaced inner and outer tubes defining an annular space therebetween, nozzles secured to the ends of said tubes sealing said annular space and defining therewith a central fluid passage and an annular fuel chamber, fissionable fuel in said chamber, said fuel comprising pairs of segments of cylinders provided with arcuate surfaces engaging the outer tube and complementary tapered surfaces in wedge engagement with each other to urge each pair of segments radially outwardly against the outer tube responsive to relative movement of one of said segments in each pair of segments axially of said outer tube, the arcuate surfaces on said segments having the same radius as the inner surface of the outer tube, and means applying an axial compressive force on said segments to urge them radially outwardly.

9. In a nuclear reactor fuel element, concentric spaced inner and outer tubes defining an annular space therebetween, nozzles secured to the ends of said tubes sealing said annular space and defining therewith a central fluid passage and an annular fuel chamber, fissionable fuel in said chamber, said fuel comprising pairs of segments of cylinders provided with arcuate surfaces engaging the outer tube and complementary tapered surfaces in wedge engagement with each other to urge each pair of segments radially outwardly against the outer tube responsive to relative movement of one of said segments in each pair of segments axially of said outer tube, each fuel segment having an inner arcuate surface concentric with its outer arcuate surface to provide a fuel segment of uniform wall thickness, and means within said annular space applying an axial compressive force on said segments to urge them radially outwardly.

10. In a nuclear reactor fuel element, concentric spaced inner and outer tubes defining an annular space therebetween, nozzles secured to the ends of said tubes sealing said annular space and defining therewith a central fluid passage and an annular fuel chamber, fissionable fuel in said chamber, said fuel comprising pairs of segments of cylinders provided with arcuate surfaces engaging the outer tube and complementary tapered surfaces in wedge engagement with each other to urge each pair of segments radially outwardly against the outer tube responsive to relative movement of one of said segments in each pair of segments axially of said outer tube, each pair of segments being offset axially, and means applying an axial compressive force on said segments to urge them radially outwardly.

11. In a nuclear reactor fuel element, concentric spaced inner and outer tubes, nozzles secured to the ends of said tubes and defining therewith a central fluid passage and an annular fuel chamber, pairs of fissionable fuel segments in said chamber provided with arcuate surfaces engaging the outer tube and complementary tapered surfaces in wedge engagement to urge each pair of segments radially outwardly against the outer tube responsive to relative movement of said segments axially of the outer tube, one segment of each pair being in abutting engagement with one segment of an adjacent pair, and means at one end of said chamber urging said segments axially of said tubes, to urge them radially outwardly.

12. In a nuclear reactor fuel element, concentric spaced inner and outer tubes defining an annular space therebetween, nozzles secured to the ends of said tubes sealing said annular space and defining therewith a central fluid passage and an annular fuel chamber, fissionable fuel in said chamber, said fuel comprising pairs of segments of cylinders, each segment provided with arcuate surfaces engaging the outer tube and complementary tapered surfaces in wedge engagement with each other to urge each pair of segments radially outwardly against the outer tube responsive to relative movement of one of said segemnts in each pair of segments axially of the outer tube, means applying an axial compressive force on said segments to urge them radially outwardly and a burnable poison material provided between the inner tube and said segments to control the reactivity of the fuel element.

13. In a nuclear reactor fuel element, concentric spaced inner and outer tubes defining an annular space therebetween, nozzles secured to the ends of said tubes sealing said annular space and defining therewith a central fluid passage and an annular fuel chamber, fissionable fuel in said chamber, said fuel comprising pairs of segments of cylinders provided with arcuate surfaces engaging the outer tube and complementary tapered surfaces in wedge engagement with each other to urge each pair of segments radially outwardly against the outer tube responsive to relative movement of one of said segments in each pair of segments axially of said outer tube, said segments being identical and comprising sintered high density uranium oxide, and means applying an axial compressive force on said segments to urge them radially outwardly.

References Cited in the file of this patent

UNITED STATES PATENTS

| | | |
|---|---|---|
| 1,971,433 | Tartrais | Aug. 28, 1934 |
| 2,180,883 | Scott | Nov. 21, 1939 |
| 2,414,931 | Colwell et al. | Jan. 28, 1947 |
| 2,838,452 | West et al. | June 10, 1958 |
| 2,864,758 | Shackelford | Dec. 16, 1958 |
| 2,894,893 | Carney | July 14, 1959 |

OTHER REFERENCES

Second U.S. International Conf. on Peaceful Uses of Atomic Energy, by Simpson and Rickover (Aug. 22, 1958), A/Conf. 15/P/2462. Copy in Div. 46, 204/193.2–.34

G.E.R.–1301, March 1957. G. E. publication. Report on Dresden Nuclear Power Station, presented at ASME Meeting, N.Y.C. Nov. 26, 1956. Copy available from General Electric Company Office; copy in Div. 46.